United States Patent [19]

Franklin

[11] 4,100,001
[45] Jul. 11, 1978

[54] THERMALLY CRYSTALLIZABLE GLASSES AND GLASS-CERAMICS MADE THEREFROM

[75] Inventor: Earl W. Franklin, Toledo, Ohio

[73] Assignee: Owens-Illinois, Inc., Toledo, Ohio

[21] Appl. No.: 788,066

[22] Filed: Apr. 15, 1977

[51] Int. Cl.² ............................ C03C 3/22; C03C 3/04
[52] U.S. Cl. ....................................... 106/39.7; 106/52
[58] Field of Search ................................ 106/39.7, 52

[56] References Cited

U.S. PATENT DOCUMENTS

| 2,920,971 | 1/1960 | Stookey | 106/39.7 |
| 3,157,522 | 11/1964 | Stookey | 106/39.7 |
| 3,625,718 | 12/1971 | Petticrew | 106/39.7 |
| 3,779,856 | 12/1973 | Pirooz | 106/39.7 |
| 3,970,463 | 7/1976 | Planchock et al. | 106/39.7 |
| 4,009,042 | 2/1977 | Rittler | 106/39.7 |
| 4,011,091 | 3/1977 | McCollister | 106/39.7 |
| 4,033,775 | 7/1977 | Grossman | 106/39.7 |

Primary Examiner—Winston A. Douglas
Assistant Examiner—Mark Bell
Attorney, Agent, or Firm—Charles S. Lynch; E. J. Holler

[57] ABSTRACT

Thermally crystallizable glass and glass-ceramic compositions, having a narrow critical range of compositions coming within the $SiO_2$-$Al_2O_3$-$Li_2O$ system, consist essentially of $SiO_2$, $Al_2O_3$, $Li_2O$, $TiO_2$ and $ZrO_2$, contain 18.2-20.3 parts $Al_2O_3$ per 100 parts by weight of $SiO_2 + Al_2O_3 + Li_2O$, have $Li_2O$ to $Al_2O_3$ molar ratio of 0.55 to 0.63, and contain 2.8-5 weight percent $TiO_2 + ZrO_2$. Glass-ceramics of superior static fatigue resistance can be made from such glasses.

5 Claims, No Drawings

THERMALLY CRYSTALLIZABLE GLASSES AND GLASS-CERAMICS MADE THEREFROM

The present invention relates to thermally crystallizable glasses and glass-ceramics having a narrow critical range of compositions coming within the $SiO_2$-$Al_2O_3$-$Li_2O$ system.

In U.S. Pat. No. 3,809,599 is described a glass-ceramic inner liner for a gas turbine engine and a method of making such an inner liner. The patent also discloses a number of glass-ceramic compositions having certain superior properties for use as an inner liner in such a gas turbine.

Experience with gas turbine inner liners has revealed a need for a glass-ceramic having the properties disclosed in said U.S. Pat. No. 3,809,599 and in U.S. Pat. No. 3,970,463, which describes such compositions in more detail, but also having improved static fatigue resistance when compared to compositions disclosed in U.S. Pat. No. 3,970,463.

It has now been found that certain glass compositions in the $SiO_2$-$Al_2O_3$-$Li_2O$ field can be thermally crystallized to excellent low expansion glass-ceramic materials and that a critical range of such compositions can be crystallized, with proper heat treatment, to glass-ceramics materials having improved static fatigue resistance at high temperatures and improved resistance to permanent deflection. Moreover, such glasses can be crystallized to glass-ceramics having a low average linear coefficient of thermal expansion ($\alpha$) of less than $15 \times 10^{-7}/°C$ over the range from 25° to 700° C, as well as a flexural strength at 1700° F of at least 12,000 psi after grinding or abrading the surface, and excellent dimensional stability under conditions which will be described hereafter.

The glass and glass-ceramic compositions of the present invention consist essentially of $SiO_2$, $Al_2O_3$, $Li_2O$, and nucleants $TiO_2$ and $ZrO_2$. When felt necessary my compositions can contain as fining agents small amounts of antimony oxide and/or arsenic oxide, which are preferably present in no more than 0.5 weight percent total, where the oxides are expressed as $Sb_2O_3$ and $As_2O_3$, respectively. $Sb_2O_3$ is now preferred.

My compositions, when expressed on the basis of 100 weight parts $SiO_2 + Al_2O_3 + Li_2O$, contain 18.2–20.3 weight parts $Al_2O_3$. The glasses and glass-ceramics of the invention contain 0.55 to 0.63 moles of $Li_2O$ for each mole of $Al_2O_3$ and contain 2.8 to 5 weight percent $TiO_2 + ZrO_2$, based on the total composition, including 1–2 percent $TiO_2$ and 1.2–3 percent $ZrO_2$. Usually $TiO_2$ is in the range of 1.2–1.9 weight percent and $ZrO_2$ in the range from 1.4–2 weight percent.

I have discovered in particular that the lower molar $Li_2O/Al_2O_3$ ratio of my compositions (which contain the restricted 18.2–20.3 weight percent range of $Al_2O_3$ noted above) as compared to the compositions in U.S. Pat. No. 3,970,463, makes it possible to prepare glass-ceramics having much better fatigue resistance than when using the $Li_2O/Al_2O_3$ ratios recommended in said patent.

It is important that the compositions of the invention, aside from fining agents, consist essentially solely of the three essential ingredients plus the nucleating agents coming within the weight amounts and molar ratios defined above. It is imperative that the impurities be kept to an absolute minimum. While no impurities should be present it is recognized that it is almost impossible to make glass without some impurities unless only pure materials were used in the batch. This is not possible on any commercial scale because of the costs. However, care should be maintained in selecting batch materials for making the glasses to insure that impurities in the resulting glasses are kept as low as practicable.

Thus, $Na_2O$ and $K_2O$ are usually held to no more than 0.2 weight percent total and preferably no more than 0.1 weight percent. Small amounts of fluoride ion are very detrimental to static fatigue resistance and F should be held to less than 0.1 weight percent or altogether eliminated. Iron oxide when present as an impurity can be tolerated in an amount less than 0.5 weight percent, expressed as $Fe_2O_3$. ZnO tends to lower the coefficient of thermal expansion, which is usually to be desired, but it decreases the static fatigue resistance and the rate of permanent deflection or deformation so, if used at all, should be present in amounts of 0.2 weight percent of the composition, or less.

In a specific example of the invention a glass batch was melted using the following batch materials in the indicated amounts:

|  | Parts by Weight |
| --- | --- |
| Ottawa silica[1] | 10569.4739 |
| A-10 alumina[2] | 2788.9731 |
| Lithium carbonate[3] | 822.7151 |
| Antimony trioxide[4] | 44.9995 |
| $ZrO_2$ frit[5] | 1045.2856 |
| Lithium nitrate[6] | 157.5000 |
| Titanox ($TiO_2$)[7] | 217.4282 |
| (Fusion loss | 646.3752) |

[1] 99.54 wt% $SiO_2$, 0.0130 wt% $TiO_2$, 0.0500 $Al_2O_3$, 0.0190 $Fe_2O_3$
[2] 99.67 wt% $Al_2O_3$, 0.12 $SiO_2$, 0.032 $Fe_2O_3$, 0.13 $Na_2O$
[3] 40.0000 wt% $Li_2O$, 0.0005 wt% $Fe_2O_3$, balance $CO_2$
[4] 100% $Sb_2O_3$
[5] 65.4000 wt% $SiO_2$, 22.9600 $ZrO_2$, 0.0029 $Fe_2O_3$, 11.9000 $Li_2O$
[6] 100% $LiNO_3$
[7] 99.4000 wt% $TiO_2$, 0.0113 $Fe_2O_3$ This batch was thoroughly mixed and then melted in a gas-fired furnace with mechanical stirring at a temperature of 3100° F for about 19 hours, after which the temperature was lowered to 2850° F and cane was drawn. The melt was then reheated to 3100° F and one inch thick slabs were cast. The cane and the slab samples were of good quality. They were annealed at 1400° F for 2 hours.

The glass so made was the glass of composition 2 shown in Table I. In addition to the components shown in Table I composition 2 contained as impurities $Na_2O$ and iron oxide expressed as $Fe_2O_3$ in the amounts of less than 0.025 and less than 0.02 weight percent $Na_2O$ and $Fe_2O_3$, respectively.

The glass samples were heat treated for crystallization to a glass-ceramic by heating according to the following schedule:

| Heating or Cooling Rate, °F/Hr. | Temp. °F | Hours at Temperature |
| --- | --- | --- |
| 100 | 1350 | 0 |
| 10 | 1400 | 0 |
| 5 | 1700 | 0 |
| 10 | 1900 | 0 |
| 25 | 2200 | 12 |
| 10 | 1800 | 0 |
| (Furnace rate to room temperature) | | |

It should also be noted that compositions 1 and 3–5 in Table I were also heat treated according to the same schedule.

The glass-ceramic so produced was tested for static fatigue resistance, permanent deflection under load, linear coefficient of thermal expansion, dimensional stability and flexural strength in the manner described hereafter. Results are shown in Table I, as well as test results for compositions 1 and 3–10, which were melted and formed as glasses and heat treated in a manner similar to that described with respect to composition 2. However, the heat treatment schedule for compositions 6–10 of Table I was somewhat different and was as follows:

| Heating or Cooling Rate, ° F/Hr. | Temp. ° F | Hours at Temperature |
| --- | --- | --- |
| 100 | 1350 | 0 |
| 10 | 1400 | 0 |
| 5 | 2050 | 0 |
| 25 | 2200 | 12 |
| 10 | 1800 | 0 |
| (Furnace rate to room temperature) | | |

Either of the foregoing heat treatment schedules are satisfactory to crystallize any glass of the invention to a glass-ceramic of the invention.

As will be understood the lower initial stages of heat treatment involve nucleation and the later stages involve growth of small crystals, according to known principles. Details of methods of determining optimum nucleation temperature ranges and crystallization temperature for crystallizable $SiO_2 \cdot Al_2O_3 \cdot Li_2O$ glasses are set forth in U.S. Pat. Nos. 3,625,718; 3,615,759; and 3,380,818. Many other heat treatment schedules will produce glass-ceramics from the presently claimed glasses. I have found in general, however, that the high temperature crystallizing portion of the heat treatment should be over 2100° F, usually at least about 2200° F to obtain glass-ceramics having the most improved static fatigue resistance. Shorter times of heating, at the lower temperatures particularly, can be used than in the schedules shown, if the article to be crystallized is relatively thin. The heat treatment schedules shown are such that they can be used successfully on large castings.

The static fatigue test was effected at 1700° C. Centerless ground glass-ceramic rods of about 0.2 inches in diameter were supported on two alumina knife edges spaced 2 inches apart. The grinding was accomplished with a 320 grit SiC wheel. A constant load was applied at the center of the rods, and the load was such as to result in a stress of 12,000 psi according to the well known formula, $$\text{MOR (or stress)} = \frac{8 \times \text{Load} \times \text{Span (inches)}}{\pi D^3}$$

where the Load is in pounds and the diameter in inches. For a 0.2 inch diameter rod the load was 18.8 pounds; for rods whose diameters deviated slightly from the 0.2 inch, standard, the load was varied to make the stress equal the 12,000 psi standard. If a rod broke before 200 hours under such load at 1700° F, it was considered to have failed.

The permanent deflection was determined on rods prepared, supported and loaded in exactly the same manner as described with respect to the static fatigue test, and this test was carried out at the same 1700° F temperature. If a given rod reached 200 hours without breaking, the amount of vertical mid-point deflection in inches was measured at this time and usually also later if the sample survived for a longer time. If the sample broke before 200 hours it was considered not to be satisfactory simply because of the breakage under fatigue before this interval of time. Compositions of the invention can be thermally crystallized to glass-ceramics having a mid-point deflection in such test of less than 0.01 inches after 200 hours at 1700° F test temperature.

In Table I is shown both the average rate of deflection per hour and the total deflection after 200 hours if the sample survived 200 hours.

The tested flexural strength (modulus of rupture) of the crystallized material was determined using crystallized cane samples, of about 0.20 inch in diameter. The modulus of rupture tests were made using a Dillon Universal Tester. This machine applies a measured load through a single knife edge to the center of a 2 inch long sample of cane supported on two knife edges (3-point loading). The load is applied at a constant rate of about 8.2 pounds per minute until failure occurs. The test was run at the temperature indicated in the table, either room temperature or 1700 ° F. The modulus of rupture is calculated according to the formula:

$$\text{MOR} \frac{8 \times \text{Load} \times \text{Span (inches)}}{\pi D^3}$$

where Load and D are as before defined. The rods were ground in the same manner as described with respect to the static fatigue test. However, rods ground before crystallization and rods ground after crystallization were both tested. Results are in pounds per square inch. It should be noted that the rate of loading used in this test was slower than usual, leading to conservative (i.e., lower) values for the breaking strength.

The dimensional stability was determined by heating crystallized rods for 1000 hours at 1800° F and then measuring the change in length of the rod in parts per million. The length measurements were made before heating and after heating, both measurements being at room temperature. Values are reported in parts per million. All compositions of the invention can be crystallized to glass-ceramics that undergo a change in dimension of less than 300 ppm in this test.

In Table I the compositions are given in weight percent. In Table II the weight percentages of $SiO_2$, $Al_2O_3$ and $Li_2O$ are shown on the basis of 100 parts of $SiO_2$, $Al_2O_3$ and $Li_2O$.

TABLE I

| Composition: | 1 | 2 | 3 | 4 | 5 | 6 | 7 | 8 | 9 | 10 |
| --- | --- | --- | --- | --- | --- | --- | --- | --- | --- | --- |
| Component | | | | | | | | | | |
| $SiO_2$ | 74.79 | 74.79 | 74.02 | 74.71 | 76.76 | 74.79 | 74.79 | 75.76 | 74.53 | 74.02 |
| $Al_2O_3$ | 18.11 | 18.61 | 17.92 | 18.07 | 16.44 | 18.42 | 18.72 | 17.74 | 18.55 | 18.42 |
| $Li_2O$ | 3.75 | 3.25 | 3.71 | 3.74 | 3.40 | 3.40 | 3.10 | 3.11 | 3.24 | 3.21 |
| $TiO_2$ | 1.45 | 1.45 | 1.45 | 1.45 | 1.45 | 1.45 | 1.45 | 1.45 | 1.45 | 1.45 |
| $TiO_2$ | 1.45 | 1.45 | 1.45 | 1.45 | 1.45 | 1.45 | 1.45 | 1.45 | 1.45 | 1.45 |
| $ZrO_2$ | 1.60 | 1.60 | 2.60 | 1.60 | 1.60 | 1.60 | 1.60 | 1.60 | 1.60 | 1.60 |
| $Sb_2O_3$ | 0.30 | 0.30 | 0.30 | 0.30 | 0.30 | 0.30 | 0.30 | 0.30 | 0.30 | 0.30 |
| $F_2$ | — | — | — | 0.20 | — | — | — | — | — | — |
| ZnO | — | — | — | — | — | — | — | — | 0.33 | 1.00 |

TABLE I-continued

| Composition: | 1 | 2 | 3 | 4 | 5 | 6 | 7 | 8 | 9 | 10 |
|---|---|---|---|---|---|---|---|---|---|---|
| $Li_2/Al_2O$ Mol Ratio | 0.707 | 0.596 | 0.706 | 0.706 | 0.706 | 0.629 | 0.564 | 0.597 | 0.596 | 0.595 |
| $\alpha(25-700°\ C)\times 10^7$ | 0.0 | 9.8 | — | — | — | 7.8 | 10.1 | 9.8 | 5.7 | 6.7 |
| Deflection, Rate, inches/Hr$\times 10^4$ | 0.918 | 0.193 | — | — | — | 0.2975 | 0.1725 | 0.2609 | 0.66 | 1.45 |
| Total inches/200 Hrs$\times 10^4$ | $F^1$ | 40 | — | — | — | 59.5 | 34.5 | 33.5 | $F^1$ | $F^1$ |
| Static Fatigue | $F^1$ | $P^2$ | $F^1$ | $F^1$ | $F^1$ | $P^2$ | $P^2$ | $P^2$ | $N^3$ | $F^1$ |
| Moduless of Rupture | | | | | | | | | | |
| Ground as ceramic, 1700° F | — | 23000 | — | — | — | — | — | — | — | — |
| Room T. | 19800 | 22100 | — | — | — | — | — | — | — | — |
| Ground as glass, 1700° F | — | 26200 | — | — | — | — | — | — | — | — |
| Room T. | 27000 | 31000 | — | — | 26700 | — | — | — | — | — |
| Dimensional Stability, ppm | −115 | −164 | −148 | 163 | −91 | — | — | — | — | — |

[1] Failed before 200 hours
[2] Passed test  [3] Failed sometimes, passed other times

TABLE II

| Composition: | 1 | 2 | 6 | 7 | 8 |
|---|---|---|---|---|---|
| Component | | | | | |
| $SiO_2$ | 77.38 | 77.38 | 77.38 | 77.38 | 78.79 |
| $Al_2O_3$ | 18.74 | 19.25 | 19.10 | 19.41 | 18.40 |
| $Li_2O$ | 3.88 | 3.36 | 3.52 | 3.21 | 3.22 |

While in Table I very few of the compositions were tested for flexural strength precisely according to the test described herein, it is noted all glass-ceramic products of that Table were subjected to the static fatigue test and that those compositions that survived that test at 1700° F obviously had a modulus of rupture of at least 12,000 psi at that temperature.

Comparision of composition 1, having an $Li_2O/Al_2O_3$ ratio of about 0.7, with composition 2, having an $Li_2O/Al_2O_3$ ratio of about 0.6 shows the dramatic difference in the rate of deflection under load and the static fatigue, caused by the difference in this ratio. With respect to composition 9, it is noted that the low amount of ZnO therein did not cause marginal failure in the static fatigue test and that the increase in the rate of permanent deformation or deflection was not as marked as in, for instance, composition 1. On the other hand, the coefficient of thermal expansion was desirably lowered when compared to composition 2. The foregoing facts suggest that one may desire to purposely include the 0.2 weight percent or less ZnO permitted by my disclosure herein when a lower expansion is of special importance in a given application.

In addition to the compositions of the invention which are shown in Table I, further glass compositions of the invention are shown in Table III. The compositions are expressed in weight percent.

TABLE III

| Composition: | 12 | 13 | 14 | 15 | 16 |
|---|---|---|---|---|---|
| Component | | | | | |
| $SiO_2$ | 76.00 | 73.55 | 74.20 | 73.79 | 73.64 |
| $Al_2O_3$ | 17.65 | 19.50 | 19.25 | 19.30 | 19.26 |
| $Li_2O$ | 3.00 | 3.60 | 3.20 | 3.56 | 3.55 |
| $TiO_2$ | 1.30 | 1.7 | 1.45 | 1.45 | 1.45 |
| $ZrO_2$ | 1.75 | 1.35 | 1.60 | 1.60 | 1.60 |
| $Sb_2O_3$ | 0.30 | 0.30 | 0.30 | 0.30 | 0.30 |
| ZnO | — | — | — | — | 0.20 |

In the following Table IV these compositions are shown on the 100% $SiO_2$-$Al_2O_3$-$Li_2O$ basis. Also shown is the $Li_2O/Al_2O_3$ molar ratio.

TABLE IV

| Composition: | 12 | 13 | 14 | 15 | 16 |
|---|---|---|---|---|---|
| Component | | | | | |
| $SiO_2$ | 78.63 | 76.10 | 76.77 | 76.35 | 76.35 |
| $Al_2O_3$ | 18.26 | 20.18 | 19.92 | 19.97 | 19.97 |
| $Li_2O$ | 3.10 | 3.72 | 3.31 | 3.68 | 3.68 |
| Mol Ratio | | | | | |
| $Li_2O/Al_2O_3$ | 0.580 | 0.630 | 0.567 | 0.629 | 0.629 |

When the glasses of the invention are thermally crystallized using the high final crystallization temperatures disclosed herein they form crystals in the keatite solid solution series of the $Li_2O \cdot Al_2O_3 \cdot n\ SiO_2$ system where $n$ is greater than 4. The products are crystalline ceramics containing a multitude of substantially homogeneously dispersed, randomly oriented crystals formed by thermal crystallization from the glass, essentially all of which are in their largest lineal dimension less than 5 microns across. While keatite solid solution crystals are present in much greater amounts, either by volume or by weight than any other crystals, other siliceous crystals are sometimes present in small amounts and small amounts of nucleant crystals may also present in the final product. The glasses of the invention can also be heat treated for crystallization at lower final temperatures to obtain glass-ceramics containing high quartz solid solution crystals instead of keatite crystals, but such products do not represent a preferred use of the present glasses.

As will be evident to those skilled in the art, various modifications of this invention can be made or followed in the light of the foregoing disclosure and discussion without departing from the spirit and scope of the disclosure or from the scope of the claims.

I claim:

1. A thermally crystallizable glass composition consisting essentially of $SiO_2$, $Al_2O_3$, $Li_2O$ and the nucleants $TiO_2$ and $ZrO_2$, said compositions (1) containing 18.2–20.3 parts $Al_2O_3$ per 100 parts by weight of $SiO_2 + Al_2O_3 + Li_2O$ (2) having $Li_2O$ present in a ratio of from 0.55 to 0.63 moles for each mole of $Al_2O_3$ present and (3) containing 2.8–5 weight percent $(TiO_2 + ZrO_2)$ based on the total composition, including 1–2 weight percent $TiO_2$ and 1.2–3 weight percent $ZrO_2$.

2. A glass composition of claim 1 containing ZnO in an amount of up to 0.2 weight percent of said glass composition.

3. A glass composition of claim 1 containing 1.2–1.9 weight percent $TiO_2$ and 1.4–2 weight percent $ZrO_2$.

4. A glass-ceramic resulting from the thermal crystallization of a glass composition consisting essentially of $SiO_2$, $Al_2O_3$, $Li_2O$ and the nucleants $TiO_2$ and $ZrO_2$, said compositions (1) containing 18.2–20.3 parts $Al_2O_3$ per 100 parts by weight of $SiO_2 + Al_2O_3 + Li_2O$ (2) having $Li_2O$ present in a ratio of from 0.55 to 0.63 moles for each mole of $Al_2O_3$ present and (3) containing 2.8–5 weight percent $(TiO_2 + ZrO_2)$ based on the total composition, including 1–2 weight percent $TiO_2$ and 1.2–3 weight percent $ZrO_2$.

5. A glass-ceramic of claim 4 wherein said glass contains 1.2–1.9 weight percent $TiO_2$ and 1.4–2 weight percent $ZrO_2$.

* * * * *